Patented Oct. 13, 1942

2,298,640

UNITED STATES PATENT OFFICE 2,298,640

LUBRICATING COMPOSITION

Carl F. Prutton, Cleveland Heights, Ohio, assignor to The Lubri-Zol Corporation, Wickliffe, Ohio, a corporation of Ohio No Drawing. Application May 13, 1942, Serial No. 442,851

43 Claims. (Cl. 252—50)

This invention relates as indicated to certain new lubricating compositions having desirable properties not possessed by any previously available lubricant, as well as to certain previously known general types of lubricants which, according to this invention, are so improved that they may be advantageously employed for purposes for which they heretofore have not been practically useful.

A particular property required by many lubricants used today is an ability to prevent seizure and scoring of relatively moving metallic surfaces operating under extremely high pressures per unit area, in many cases considerably in excess of 10,000 pounds per square inch. Pressures on this order have long been encountered in the metal working industry, particularly in die drawing, sheet metal forming, etc. Lubricants for such uses have generally contained appreciable amounts of certain materials which are decidedly corrosive to the metals with which they have been used. Although dies had frequently to be replaced, such corrosion has been tolerated in order to achieve extreme pressure lubrication and could be tolerated only because the relatively moving metallic surfaces lubricated did not operate in contact with each other for any length of time and accordingly there was no appreciable corrosion of the surfaces of the materials being worked.

Most, if not all, of the presently known extreme pressure addition agents employed in lubricants rely upon one form or another of chemical or physico-chemical action between the addition agent and the relatively moving surfaces for the desired extreme pressure effect.

It is generally true that those addition agents which most greatly improve the extreme pressure characteristics of the lubricant are likewise the most chemically active. The sole fact that an addition agent very greatly improves the extreme pressure characteristics of the resultant composition does not in itself, therefore, render such addition agent desirable for all uses since its general corrosive character may, by far, outweigh the beneficial effect of the same in imparting extreme pressure characteristics.

When a lubricant is used in the crank case or even the gear cases of automobiles and the like, such lubricant must not be normally chemically active to any substantial degree. Otherwise the lubricant will either destroy or at least render inoperative in a very short time the very mechanism it is desired to protect. As above pointed out, if the lubricant is to possess extreme pressure characteristics it must, however, under the conditions imposed by extreme pressures in use, be chemically or physico-chemically active to a degree on the bearing surfaces in order to prevent seizure and scoring of such surfaces.

In my issued Patent No. 1,986,651 I have provided one solution to this problem, by pointing out that the general stability of the halogenated carbon ring compounds is such that under ordinary conditions they will not hydrolize and cause undesirable corrosion but nevertheless under conditions of extreme pressure and relative movement of the bearing surfaces they are sufficiently active to provide the desired extreme pressure characteristics.

As above indicated, there are numerous materials which, on account of their chemical activity, are very effective in imparting extreme pressure characteristics to a lubricating composition but in the past have not been generally usable for such purpose, particularly when the lubricant in which they are employed is to be used in gear boxes and crank cases, and for the very reason of their chemical activity.

In the present-day processes for the refining of mineral lubricating oils to render the same useful under all conditions generally encountered in the field it is customary to carry such refining processes to considerable length in order to insure the removal from the finished lubricant of minor amounts of naturally occurring components which, if not removed, would render the oil undesirably corrosive. These refining processes necessary to thus insure the removal of all or substantially all of the naturally occurring corrosive components generally result, however, in a simultaneous removal or destruction of certain other valuable components in the oil, the absence or destruction of which materially decreases the efficiency and life of the lubricating composition. In addition, in the case of solvent-refined lubricating oils there sometimes remain small amounts of corrosive re-agents in the oils and certain naturally occurring corrosion inhibitors have been removed. All such refining processes are expensive.

It may also be desired to add certain corrosive organic compounds to lubricants to act as pour-point depressors, anti-oxidants, agents to improve oiliness, etc. The advent of a suitable corrosion inhibitor thus greatly enlarges the field of opportunity to improve lubricants in a wide variety of ways.

It is a principal object of this invention, therefore, to provide a lubricating composition which employs to advantage the desirable characteristics of the lubricants or lubricant addition agents but in such manner and in such form that the previously mentioned undesirable characteristics thereof are either entirely eliminated or reduced to such an extent as to be no longer objectionable.

It is a further object of this invention to provide a lubricating composition containing a combination of addition agents in which the effect of at least one of such addition agents is to negative the undesirable characteristics of the other and at the same time cooperate therewith to improve to an exceptional degree its desirable properties.

It is a still further object of this invention to provide a lubricating composition which employs as its primary constituent or base a lubricant or oil which heretofore has not been usable as such except upon extensive refinement, thus obtaining a final composition which is not only more economical to produce but which also has superior lubricating properties.

Other objects of this invention will appear as the description proceeds.

To the accomplishment of the foregoing and related ends, this invention, then, consists of the means hereinafter fully described, and particularly pointed out in the claims, the following description setting forth in detail certain approved combinations of ingredients embodying my invention, such disclosed means constituting, however, but certain of various forms in which the principle of the invention may be used.

This invention, broadly stated, comprises the use in lubricating compositions of suitable organic corrosion inhibitors which render useful for general lubricating purposes compositions which heretofore, due either to a naturally occurring corrosive component or the presence of an intentionally added component, would not be thus generally useful.

A composition according to the present invention can best be described by having reference to the component parts thereof and accordingly in the following description such components will be described in substantially the order of their volumetric participation in the final composition.

The oil base

The oil base, which in a lubricating composition formed in accordance with the present invention usually amounts to from about 50% to about 99% of the total composition, may be any suitable lubricating oil such as a mineral lubricating oil derived from the refinement of petroleum or any of the so-called non-mineral oils such as animal, vegetable and synthetic oils.

This invention also relates to the type of lubricating compositions generally referred to as greases and which contain appreciable amounts of some thickening materials such as soap.

The viscosity of the oil base will usually depend upon two principal factors, the first and most important of which is the use to which the finished lubricating composition will be placed, and of secondary importance is the effect of the particular addition agents employed upon the viscosity of the oil base. For most purposes a lubricating oil base having a low pour point and low rate of change in viscosity per degree of temperature change of the lubricant will be most desirable. However, in this connection it should be pointed out that certain of the addition agents contemplated in accordance with this invention are effective to improve the cold test of most oils such as mineral lubricating oils so that when such addition agents are employed a base oil having a relatively poor cold test may, because of the improvements in cold test by addition agents, be entirely satisfactory for use as a base in a composition according to this invention.

While the so-called non-mineral oils above identified which are intended to include such oily liquids as the fatty acids, oleic acid, etc., are generally not as desirable for use as the base of the composition as a mineral lubricating oil, nevertheless such non-mineral oils may be used to advantage as a substitute for a part of the mineral oil base particularly when certain properties usually resulting from the use of such non-mineral oils are desired. More specifically, this invention contemplates the employment of minor amounts of certain of the non-mineral oils as a part of the oil base, and accordingly a component of the final composition, in order to increase the oiliness factor of the finished lubricant. While certain of the so-called non-mineral oils, as well as certain constituents which are sometimes found as naturally occurring components of mineral lubricating oils would normally be so corrosive as to prohibit their use in lubricants employed in crank cases or the like where high temperatures and pressures are encountered, nevertheless the addition of the corrosion inhibitors and stabilizers contemplated by this invention makes such components useful for these purposes.

The primary addition agent

This class of components which may, within the contemplation of this invention, be added to and form a part of the finished lubricating composition is designated as that of primary addition agents for the reason that these materials are usually added for the purpose of providing the principal improvement or primary change in the base oil to which they are added. The characteristics of the resultant composition to the achievement of which these so-called primary addition agents are added are generally extreme pressure charactertistics, improved cold test, reduced sludge formation and the like.

The relatively unstable halogenated organic compounds which may be employed as addition agents in accordance with the present invention and which, due to their less stable character, hydrolize readily in the presence of the moisture usually found in lubricating oils and thus become corrosive or give up at least part of their combined halogen in some other way, are the halogenated, or more specifically, chlorinated open chain compounds, as well as certain of the less stable halogenated, or more specifically, chlorinated organic ring compounds, e. g. those formed by the "addition" reaction of an organic ring compound with a halogen.

By corrosive addition agents are generally meant such compounds as contain or will easily liberate a substance which will spontaneously react in a continuing manner at ordinary temperatures with such metals as are usually found in service. Free sulphur, hydrogen sulphide, free chlorine, and hydrogen chloride are typical examples of such active substances which may be thus released.

Although we do not intend this invention to be limited by any explanation or theory of chemical action, the following is a brief exposition of the theory which best explains the ends obtained by this invention. It is believed that most corrosive action on metals is electrolytic, galvanic cells being set up by the metal and small amounts of impurities contained therein, or by the metals of an alloy, as on the surfaces or alloy bearings. A corrosion inhibitor, according to this invention, is therefore an agent which will form protective insulating films on anodic surfaces or will keep the immersion media at low oxygen concentrations in order to prevent depolarization of the deposited hydrogen which also provides a protective film. Organic phosphates are thought to inhibit galvanic action by forming protective films and amino compounds have the same effect by preventing the depolarization of deposited hydrogen. Phosphites probably have both effects and this may account for their outstanding merit as corrosion inhibitors.

Any of the commonly available halogenated open chain compounds such as the following are good examples of corrosive addition agents. They are desirable as extreme pressure addition agents and some also tend to lower the pour-point of the lubricant.

The aliphatic halogen compounds, e. g.

$C_xCl_2$ e. g.:
$CCl_4$
$C_2Cl_4$
$C_2Cl_6$ $C_xH_yCl_z$ e. g.:
$C_2HCl_3$
$C_2HCl_5$
$(C_2H_4Cl)_2O$
$C_{17}H_{33}Cl_2COOH$

Halogenated complex petroleum products

In addition to the halogenated open chain compounds, we have also found that halogenated organic ring compounds of the addition type, of which the following are examples, are likewise well-suited for use in compositions in accordance with this invention:

Addition type aromatic compounds, e. g.

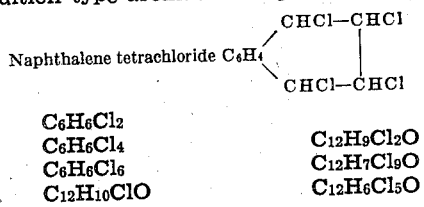
Naphthalene tetrachloride $C_6H_6Cl_2$
$C_6H_6Cl_4$
$C_6H_6Cl_6$
$C_{12}H_{10}ClO$ $C_{12}H_9Cl_2O$
$C_{12}H_7Cl_3O$
$C_{12}H_6Cl_5O$ Likewise certain halogen substitution products of which the following are examples are more or less corrosive:

Substitution type aromatic compound, e. g.

Chlorbenzoic acid
Chlornitrobenzene
Benzyl chloride ($C_6H_5CH_2Cl$)
Phenyl ethyl chloride ($C_6H_5CH_2CH_2Cl$)

Among the more or less corrosive organic sulphur compounds which are of especial advantage as extreme pressure addition agents the following are representative examples:

Highly sulphurized polysulphides (where more than two S atoms are in one chain), e. g.

R—S—S—S—R (where R is an organic group, for example an alkyl group such as butyl or lauryl, or an aryl group such as phenyl or benzyl)

R—NH$_2$.H$_2$S

Sulphur chloride treated oils, either mineral or non-mineral

Sulphur chloride treated fatty acids.

Also, the effectiveness of free sulphur as an extreme pressure agent is well known.

The free fatty acids and halogen-bearing derivatives of them are examples of corrosive agents which are often desirable because they improve the oiliness: Oleic, stearic, and naphthenic acids are good examples.

The amount of extreme pressure addition agent of any type which may be added to the lubricant should not exceed about 20% by weight of the lubricating oil base since in most cases more would tend to unduly decrease the viscosity of the composition. For crank case lubrication about .1% to 2%, based on the amount of oil, is a preferred range and for gear lubrication about 1 to 10% is preferred. Of course, some compounds are more active than others and smaller amounts are often effective, even less than .1%. When intended for use in top-oilers for automobile cylinders and the like a larger amount up to five or even ten per cent is often desirable and for certain applications and certain addition agents the amount added may be much larger, up to about 20%, without unduly reducing the viscosity of the lubricant.

These limitations are also generally applicable to most of the types of addition agents commonly added to lubricating oils. It should be noted, however, that some compounds especially suitable for lowering the pour-point of lubricants need only be added in amounts considerably less than those indicated above.

*The corrosion inhibitors*

These components of the finished lubricating composition are generally referred to as corrosion inhibitors since they are primarily employed for the purpose of rendering non-corrosive either the oil base or the primary addition agent, or the combination of the same. It should be noted, however, that the components hereinbelow given as representative examples of corrosion inhibitors which may be employed in accordance with this invention likewise have other desirable advantages when used as components and in certain cases such other advantages may be of even greater importance than their corrosion inhibiting characteristics.

These corrosion inhibitor components should be soluble or miscible in the oil base and compatible therewith. Specific examples of these corrosion inhibitors are as follows:

Mono-amyl amine
Di-amyl amine
Tri-amyl amine
Aniline
Di-ethyl aniline
Di-phenyl amine
Tri-phenyl amine
α-Naphthyl amine It will be observed that all of the corrosion inhibitors given in the above list are sulphur-free, nitrogen-containing, organic corrosion inhibitors.

Specific examples of nitrogen and oxygen-containing organic corrosion inhibitors are as follows:

Tri-ethanol amine
Amino phenols
Amino naphthols
Di-ethyl amino phenol
Benzyl amino phenol
Hydroxy quinoline
p-Amino benzophenone
Benzoyl α-naphthyl amine Specific examples of nitrogen and sulphur containing corrosion inhibitors are as follows:

Thiodiphenyl amine
Benzyl thiocyanate
Thio-ureas, e. g.
  Thiocarbanilide and related compounds, such as:
    $(RR'N)_2 CS$ (where R and R' are organic radicals or hydrogen), e. g.
      Thio-urea, $(NH_2)_2 CS$ Specific examples of oxygen containing organic corrosion inhibitors are as follows:

Esters and ester-ketones, e. g. those derived from the oxidation of petroleum hydrocarbons
α-Naphthol
Catechol
Guaiacol The sulphur-containing organic corrosion inhibitors may be classified and described as follows:

(1) Organic sulphides and disulphides
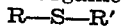
Where R and R' are organic radicles, e. g.
   (a) Alkyl radicles, e. g.
      Butyl
      Amyl
      Lauryl
      Cetyl
   (b) Aryl radicles, e. g.
      Phenyl
      Benzyl
      Chlorbenzyl
      Xylyl
(2) Mercaptans and chlormercaptans, e. g.
   Chlor phenyl mercaptans
   Cetyl mercaptan In general, a lubricating composition in accordance with my invention may comprise a major proportion of a suitable oil base of the character above defined and a total of an effective amount up to 20% by weight, based on the amount of oil, of the previously named primary addition agents along with the necessary amount of the corrosion inhibiting agent. When the corrosion inhibiting agent is itself an extreme pressure addition agent, then a corresponding smaller amount of the corrosive agent need be added.

Generally a finished lubricating composition for uses such as a gear lubricant will preferably contain greater amounts of the primary or extreme pressure addition agent than lubricating compositions designed for use in the crank cases of internal combustion engines. Of course the type of compound, its relative activity and the particular type of gearing, for example, to be lubricated, determines in each case the proportions of the addition agents to be employed. In general, gear lubricants may contain from about 1% to about 10% of the primary or extreme pressure addition agent whereas crank case lubricants generally contain from about ½% to about 5% of the primary or extreme pressure addition agents. These figures are merely intended to indicate the relative amounts of the primary addition agents which are employed for different uses since entirely satisfactory crank case lubricants, for example, may be prepared by the employment of from about .10% to 2% of the primary addition agent.

As previously indicated, the amount of secondary or corrosion inhibiting addition agent varies depending upon the type of primary addition agent with which it is combined, the type of base oil used in compounding the composition and the ultimate use for which the finished lubricant is designed. Broadly, the corrosion inhibitors will be found of utility in percentage of from about .001% to about 10%, although for most uses amounts of from .01% to about 2% will be employed.

When most of the primary addition agents above identified are employed for use in conventional extreme pressure lubricants, the corrosion inhibitor will be used in concentrations of about .05% to about 1%. When the primary addition agent is a halogen compound and the finished lubricating composition is designed for use as a gear lubricant or crank case lubricant, the corrosion inhibitor will generally be employed in percentage of from about .1% to about .25%.

Both addition components should of course be oil-soluble within the percentages contemplated by this invention. By "oil-soluble" is also meant miscible and capable of forming stable colloidal suspensions. In order that these compounds may not be lost by volatilization when these compounds are intended particularly for use in lubricants for internal combustion engines they should be comparatively non-volatile, having vapor pressures less than atmospheric at 140° C. and preferably at 170° C.

For the purpose of lubricating and reducing the friction between the relatively moving parts of an internal combustion engine, such as crank case bearings, the addition compounds should be stable and preferably capable of distillation at atmospheric pressure without appreciable decomposition.

Some of the more important uses of the various types of compounds disclosed in this application are the following:

(1) Metal drawing and forming operations (here the least stable and most corrosive compounds are permissible).
(2) Gears and bearings under conditions of extreme pressure (requires more stable materials than (1)).
(3) Motor oil for internal combustion engines (the active materials should be more stable than in (2)).
(4) Top cylinder lubricants (only where the active compounds are particularly stable).

This application is a continuation-in-part of my copending applications Serial No. 737,070, filed July 26, 1934, and Serial No. 119,132, filed January 5, 1937, now Patent No. 2,178,514, and is a continuation in part of my copending applications, Serial Nos. 297,872, 297,873, 297,874, 297,875, and 297,876, collectively, all filed on October 4, 1939.

It should also be noted that among the corrosion inhibitors which may be used in accordance with the generic invention of this patent are any of those named in my aforesaid Patent No. 2,178,514 based on application, Ser. No. 119,132 which was copending with my aforesaid applications of which this case is a continuation.

Other modes of applying the principle of the invention may be employed, change being made as regards the details described, provided the features stated in any of the following claims or the equivalent of such be employed.

I, therefore, particularly point out and distinctly claim as my invention:

1. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., the effectiveness of which is dependent upon its ability to chemically react with the metallic surfaces to be lubricated, said composition additionally having included therein a minor amount of an oil-soluble organic corrosion inhibitor and being characterized by the fact that the inclusion of such corrosion inhibitor therein has not substantially decreased the extreme pressure properties imparted thereto by said extreme pressure addition agent.

2. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 170° C., the effectiveness of which is dependent upon its ability to chemically react with the metallic surfaces to be lubricated, said composition additionally having included therein a minor amount of an oil-soluble organic corrosion inhibitor and being characterized by the fact that the inclusion of such corrosion inhibitor therein has not substantially decreased the extreme pressure properties imparted thereto by said extreme pressure addition agent.

3. An extreme pressure lubricating composition comprising a major proportion of a refined mineral lubricating oil, the load carrying ability of which is substantially increased by the inclusion therein of a minor amount of a stable oil-soluble halogen bearing organic extreme pressure addition agent having a vapor pressure less than atmospheric at 140° C., the effectiveness of which is dependent upon its ability to chemically react with the metallic surfaces to be lubricated, said composition additionally having included therein a minor amount of an oil-soluble organic corrosion inhibitor and being characterized by the fact that the inclusion of such corrosion inhibitor therein has not substantially decreased the extreme pressure properties imparted thereto by said extreme pressure addition agent.

4. An extreme pressure lubricating composition comprising a major proportion of a refined mineral lubricating oil, the load carrying ability of which is substantially increased by the inclusion therein of a minor amount of a stable oil-soluble chlorine bearing extreme pressure addition agent having a vapor pressure less than atmospheric at 170° C., the effectiveness of which is dependent upon its ability to chemically react with the metallic surfaces to be lubricated, said composition additionally having included therein a minor amount of an oil-soluble organic corrosion inhibitor and being characterized by the fact that the inclusion of such corrosion inhibitor therein has not substantially decreased the extreme pressure properties imparted thereto by said extreme pressure addition agent.

5. An extreme pressure lubricating composition comprising essentially a refined mineral lubricating oil which inherently possesses the properties of a satisfactory lubricant for metallic bearing surfaces operating under normal conditions wherein a substantially continuous film of such oil functions as the lubricating medium between the bearing surfaces and which oil is also fortified so as to function satisfactorily under conditions which tend to disrupt such continuous oil film by having dissolved therein a small amount of a stable, oil soluble extreme pressure addition agent the effectiveness of which is dependent upon its ability to chemically react with the metallic surfaces to be lubricated under conditions of film rupture as above defined and such composition being further characterized by the inclusion therein of a minor amount of an oil soluble organic corrosion inhibitor and by the further fact that the inclusion of such corrosion inhibitor has not substantially decreased the extreme pressure properties imparted to the composition by said extreme pressure addition agent.

6. An extreme pressure lubricating composition comprising essentially a refined mineral lubricating oil which inherently possesses the properties of a satisfactory lubricant for metallic bearing surfaces operating under normal conditions wherein a substantially continuous film of such oil functions as the lubricating medium between the bearing surfaces and which oil is also fortified so as to function satisfactorily under conditions which tend to disrupt such continuous oil film by having dissolved therein a small amount, less than 20%, based on the amount of lubricating oil, of a stable, oil soluble chlorine bearing organic extreme pressure addition agent having a vapor pressure less than atmospheric at 140° C. the effectiveness of which is dependent upon its ability to chemically react with the metallic surfaces to be lubricated under conditions of film rupture as above defined and such composition being further characterized by the inclusion therein of from about .05% to about 5% of an oil soluble organic corrosion inhibitor having a vapor pressure less than atmospheric at 140° C., and by the further fact that the inclusion of such corrosion inhibitor has not substantially decreased the extreme pressure properties imparted to the composition by said extreme pressure addition agent.

7. An extreme pressure lubricating composition comprising essentially a refined mineral lubricating oil which inherently possesses the properties of a satisfactory lubricant for metallic bearing surfaces operating under normal conditions wherein a substantially continuous film of such oil functions as the lubricating medium between the bearing surfaces and which oil is also fortified so as to function satisfactorily under conditions which tend to disrupt such continuous oil film by having dissolved therein from about .1% to about 2%, based on the amount of lubricating oil, of a stable, oil soluble chlorine bearing organic extreme pressure addition agent having a vapor pressure less than atmospheric at 140° C. the effectiveness of which is dependent upon its ability to chemically react with the metallic surfaces to be lubricated under conditions of film rupture as above defined and such composition being further characterized by the inclusion therein of from about .05% to about 5% of an oil soluble organic corrosion inhibitor having a vapor pressure less than atmospheric at 140° C., and by the further fact that the inclusion of such corrosion inhibitor has not substantially decreased the extreme pressure properties imparted to the composition by said extreme pressure addition agent.

8. An extreme pressure lubricating composition comprising essentially a refined mineral lubricating oil which inherently possesses the properties of a satisfactory lubricant for metallic bearing surfaces operating under normal conditions wherein a substantially continuous film of such oil functions as the lubricating medium between the bearing surfaces and which oil is also fortified so as to function satisfactorily under conditions which tend to disrupt such continuous oil film by having dissolved therein from about .1% to about 2%, based on the amount of lubricating oil, of a stable, oil soluble chlorine bearing organic extreme pressure addition agent having a vapor pressure less than atmospheric at 140° C.

the effectiveness of which is dependent upon its ability to chemically react with the metallic surfaces to be lubricated under conditions of film rupture as above defined and such composition being further characterized by the inclusion therein of from about .05% to about 5% of an oil soluble organic nitrogen-containing corrosion inhibitor having a vapor pressure less than atmospheric at 140° C., and by the further fact that the inclusion of such corrosion inhibitor has not substantially decreased the extreme pressure properties imparted to the composition by said extreme pressure addition agent.

9. An extreme pressure lubricating composition, comprising a major proportion of a refined mineral lubricating oil, the load carrying ability of which is substantially increased by the inclusion therein of from about .1% to about 20% of a stable, oil-soluble extreme pressure addition agent, the effectiveness of which is dependent upon its ability to chemically react with the metallic surfaces to be lubricated, said composition additionally having included therein of from about .001% to about 10% of an oil-soluble organic corrosion inhibitor and being characterized by the fact that the inclusion of such corrosion inhibitor therein has not substantially decreased the extreme pressure properties imparted thereto by said extreme pressure addition agent.

10. An extreme pressure lubricating composition comprising a major proportion of a refined mineral lubricating oil, the load carrying ability of which is substantially increased by the inclusion therein of from about .1% to about 20% of a stable, oil-soluble extreme pressure addition agent having a vapor pressure less than atmospheric at 140° C., the effectiveness of which is dependent upon its ability to chemically react with the metallic surfaces to be lubricated, said composition additionally having included therein of from about .001% to about 10% of an oil-soluble organic corrosion inhibitor and being characterized by the fact that the inclusion of such corrosion inhibitor therein has not substantially decreased the extreme pressure properties imparted thereto by said extreme pressure addition agent.

11. An extreme pressure lubricating composition, comprising a major proportion of a refined mineral lubricating oil, the load carrying ability of which is substantially increased by the inclusion therein of from about .1% to about 10% of a stable, oil-soluble extreme pressure addition agent having a vapor pressure less than atmospheric at 170° C., the effectiveness of which is dependent upon its ability to chemically react with the metallic surfaces to be lubricated, said composition additionally having included therein of from about .1% to about 2% of an oil-soluble organic corrosion inhibitor and being characterized by the fact that the inclusion of such corrosion inhibitor therein has not substantially decreased the extreme pressure properties imparted thereto by said extreme pressure addition agent.

12. An extreme pressure lubricating composition comprising a major proportion of a refined mineral lubricating oil, the load carrying ability of which is substantially increased by the inclusion therein of from about .1% to about 20% of a stable, oil-soluble extreme pressure addition agent having a vapor pressure less than atmospheric at 140° C., the effectiveness of which is dependent upon its ability to chemically react with the metallic surfaces to be lubricated, said composition additionally having included therein from about .01% to about 10% of an oil-soluble organic nitrogen containing corrosion inhibitor and being characterized by the fact that the inclusion of such corrosion inhibitor therein has not substantially decreased the extreme pressure properties imparted thereto by said extreme pressure addition agent.

13. An extreme pressure lubricating composition, comprising a major proportion of a refined mineral lubricating oil, the load carrying ability of which is substantially increased by the inclusion therein of a minor amount, less than about 20% of a stable, oil-soluble organic halogen extreme pressure addition agent having a vapor pressure less than atmospheric at 140° C., the effectiveness of which is dependent upon its ability to chemically react with the metallic surfaces to be lubricated, said composition additionally having included therein from about .05% to about 5% of an oil-soluble organic nitrogen containing corrosion inhibitor having a vapor pressure less than atmospheric at 140° C. and being characterized by the fact that the inclusion of such corrosion inhibitor therein has not substantially decreased the extreme pressure properties imparted thereto by said extreme pressure addition agent.

14. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., comprising a halogenated organic ring compound and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., and being characterized by the fact that the inclusion of such corrosion inhibitor therein has not substantially decreased the extreme pressure properties imparted thereto by said extreme pressure addition agent.

15. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., comprising a halogen-bearing aromatic compound and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., and being characterized by the fact that the inclusion of such corrosion inhibitor therein has not substantially decreased the extreme pressure properties imparted thereto by said extreme pressure addition agent.

16. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., comprising a halogenated aromatic compound of the addition type and the effectiveness of which is dependent upon its ability to chemically react with the metallic surfaces to be lubricated, said composition additionally having included therein a minor amount of an oil-osluble organic corrosion inhibitor having a vapor pressure less than atmospheric at 140° C., and being characterized by the fact that the inclusion of such corrosion inhibitor therein has not substantially decreased the extreme pressure properties imparted thereto by said extreme pressure addition agent.

17. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., comprising naphthelene tetrachloride and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., and being characterized by the fact that the inclusion of such corrosion inhibtor therein has not substantially decreased the extreme pressure properties imparted thereto by said extreme pressure addition agent.

18. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., comprising a halogen-bearing aromatic compound of the substitution type and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., and being characterized by the fact that the inclusion of such corrosion inhibitor therein has not substantially decreased the extreme pressure properties imparted thereto by said extreme pressure addition agent.

19. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., comprising a halogen-bearing aromatic compound containing an aliphatic substituent and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., and being characterized by the fact that the inclusion of such corrosion inhibitor therein has not substantially decreased the extreme pressure properties imparted thereto by said extreme pressure addition agent.

20. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., comprising an aromatic substituted halogenated aliphatic compound and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., and being characterized by the fact that the inclusion of such corrosion inhibitor therein has not substantially decreased the extreme pressure properties imparted thereto by said extreme pressure addition agent.

21. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., comprising an arylated chlor-aliphatic compound and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., and being characterized by the fact that the inclusion of such corrosion inhibitor therein has not substantially decreased the extreme pressure properties imparted thereto by said extreme pressure addition agent.

22. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., comprising a compound of the type

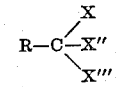

where R is an aromatic radicle; X is a halogen; and X'' and X''' are hydrogen, an organic radicle or a halogen and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., and being characterized by the fact that the inclusion of such corrosion inhibitor therein has not substantially decreased the extreme pressure properties imparted thereto by said extreme pressure addition agent.

23. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., comprising a compound in which the phenyl group has been substituted for a hydrogen atom of a halogenated aliphatic compound and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., and being characterized by the fact that the inclusion of such corrosion inhibitor therein has not substantially decreased the extreme pressure properties imparted thereto by said extreme pressure addition agent.

24. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., comprising benzyl chloride and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., and being characterized by the fact that the inclusion of such corrosion inhibitor therein has not substantially decreased the extreme pressure properties imparted thereto by said extreme pressure addition agent.

25. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., comprising a halogen bearing aliphatic compound and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., and being characterized by the fact that the inclusion of such corrosion inhibitor therein has not substantially decreased the extreme pressure properties imparted thereto by said extreme pressure addition agent.

26. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., comprising a halogen bearing aliphatic hydrocarbon compound and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., and being characterized by the fact that the inclusion of such corrosion inhibitor therein has not substantially decreased the extreme pressure properties imparted thereto by said extreme pressure addition agent.

27. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., comprising a halogenated complex petroleum product and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., and being characterized by the fact that the inclusion of such corrosion inhibitor therein has not substantially decreased the extreme pressure properties imparted thereto by said extreme pressure addition agent.

28. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., comprising an organic nitrogen compound in which the nitrogen is in a reduced state, and being characterized by the fact that the inclusion of such corrosion inhibitor therein has not substantially decreased the extreme pressure properties imparted thereto by said extreme pressure addition agent.

29. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., comprising a nitrogen-containing organic base, and being characterized by the fact that the inclusion of such corrosion inhibitor therein has not substantially decreased the extreme pressure properties imparted thereto by said extreme pressure addition agent.

30. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., comprising an amine, and being characterized by the fact that the inclusion of such corrosion inhibitor therein has not substantially decreased the extreme pressure properties imparted thereto by said extreme pressure addition agent.

31. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., comprising an aliphatic amine, and being characterized by the fact that the inclusion of such corrosion inhibitor therein has not substantially decreased the extreme pressure properties imparted thereto by said extreme pressure addition agent.

32. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., comprising di-amyl amine, and being characterized by the fact that the inclusion of such corrosion inhibitor therein has not substantially decreased the extreme pressure properties imparted thereto by said extreme pressure addition agent.

33. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., comprising a cyclic amine, and being characterized by the fact that the inclusion of such corrosion inhibitor therein has not substantially decreased the extreme pressure properties imparted thereto by said extreme pressure addition agent.

34. An extreme pressure lubricating composition comprising a major proportion of a refined material lubricating oil, the load carrying ability of which is substantially increased by the inclusion therein of a minor amount of a stable, oil-soluble extreme pressure addition agent having a vapor pressure less than atmospheric at 140° C., and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., comprising an aromatic amine, and being characterized by the fact that the inclusion of such corrosion inhibitor therein has not substantially decreased the extreme pressure properties imparted thereto by said extreme pressure addition agent.

35. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., comprising a primary amine, and being characterized by the fact that the inclusion of such corrosion inhibitor therein has not substantially decreased the extreme pressure properties imparted thereto by said extreme pressure addition agent.

36. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., comprising α-naphthyl amine, and being characterized by the fact that the inclusion of such corrosion inhibitor therein has not substantially decreased the extreme pressure properties imparted thereto by said extreme pressure addition agent.

37. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., comprising a secondary amine, and being characterized by the fact that the inclusion of such corrosion inhibitor therein has not substantially decreased the extreme pressure properties imparted thereto by said extreme pressure addition agent.

38. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., comprising a tertiary amine, and being characterized by the fact that the inclusion of such corrosion inhibitor therein has not substantially decreased the extreme pressure properties imparted thereto by said extreme pressure addition agent.

39. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140°

C., and the effectiveness of which is dependent upon its ability to chemically react with the metallic surfaces to be lubricated, said composition additionally having included therein a minor amount of an oil-soluble organic corrosion inhibitor having a vapor pressure less than atmospheric at 140° C., comprising tri-phenyl amine, and being characterized by the fact that the inclusion of such corrosion inhibitor therein has not substantially decreased the extreme pressure properties imparted thereto by said extreme pressure addition agent.

40. An extreme pressure lubricating composition comprising a major proportion of a refined mineral lubricating oil, the load carrying ability of which is substantially increased by the inclusion therein of a minor amount of a naphthalene tetrachloride, said composition additionally having included therein a minor amount of a diamyl amine, and being characterized by the fact that the inclusion of said diamyl amine therein has not substantially decreased the extreme pressure properties imparted thereto by said naphthalene tetrachloride.

41. An extreme pressure lubricating composition comprising a major proportion of a refined mineral lubricating oil, the load carrying ability of which is substantially increased by the inclusion therein of a minor amount of benzyl chloride, said composition additionally having included therein a minor amount of α-naphthyl amine, and being characterized by the fact that the inclusion of said α-naphthyl amine therein has not substantially decreased the extreme pressure properties imparted thereto by said benzyl chloride.

42. An extreme pressure lubricating composition comprising a major proportion of a refined mineral lubricating oil, the load carrying ability of which is substantially increased by the inclusion therein of a minor amount of a stable, oil-soluble extreme pressure addition agent having a vapor pressure less than atmospheric at 140° C., comprising a halogenated complex petroleum product the effectiveness of which is dependent upon its ability to chemically react with the metallic surfaces to be lubricated, said composition additionally having included therein a minor amount of tri-phenyl amine, and being characterized by the fact that the inclusion of such tri-phenyl amine therein has not substantially decreased the extreme pressure properties imparted thereto by said halogenated complex petroleum derivative.

43. A new load carrying improving agent for lubricating oils comprising a major amount of a stable oil-soluble extreme pressure addition agent having a vapor pressure less than atmospheric at 140° C., and the effectiveness of which as an extreme pressure addition agent is dependent upon its ability to chemically react with metallic surfaces, and from an effective amount, up to about 50%, based on the amount of said extreme pressure addition agent, of an oil-soluble organic corrosion inhibitor, the effectiveness of said extreme pressure addition agent as such being substantially unimpaired by the presence of said corrosion inhibitor.

CARL F. PRUTTON.